United States Patent [19]

Ohata

[11] 4,361,627
[45] Nov. 30, 1982

[54] MAGNETIC RECORDING MEDIUM

[75] Inventor: Tsumoru Ohata, Sendai, Japan

[73] Assignee: Sony Corporation, Tokyo, Japan

[21] Appl. No.: 198,152

[22] Filed: Oct. 17, 1980

Related U.S. Application Data

[63] Continuation of Ser. No. 958,420, Nov. 7, 1978, abandoned.

[30] Foreign Application Priority Data

Nov. 10, 1977 [JP] Japan ................ 52-1350792

[51] Int. Cl.³ .............................. G11B 5/70
[52] U.S. Cl. ........................ 428/425.9; 428/521;
428/694; 428/900; 252/62.54; 427/128;
427/130; 360/134
[58] Field of Search ............... 428/694, 695, 425.9,
428/900, 521, 423.1, 423.2, 423.6, 424.8, 425.3,
425.8; 427/127, 128, 130; 252/62.54; 360/134,
135, 136

[56] References Cited

U.S. PATENT DOCUMENTS

| | | |
|---|---|---|
| 3,150,995 | 9/1964 | Bauer . |
| 3,357,855 | 12/1967 | Bisschops et al. . |
| 3,460,984 | 8/1969 | Bisschops et al. . |
| 3,804,810 | 4/1974 | Fryd . |
| 3,824,128 | 7/1974 | Akashi et al. . |
| 4,115,290 | 9/1978 | Kubota et al. ........ 252/62.54 |
| 4,241,139 | 12/1980 | Kubota et al. ........ 428/425.9 |
| 4,259,395 | 3/1981 | Ayasui et al. ........ 428/901 |

FOREIGN PATENT DOCUMENTS

| | | |
|---|---|---|
| 51-69604 | 9/1976 | Japan . |
| 54-35081 | 10/1979 | Japan ........ 427/128 |
| 691921 | 10/1979 | U.S.S.R. ........ 252/62.54 |

OTHER PUBLICATIONS

Roberts, Organic Coating Properties, Selection, and Use, Building Science Series 7, 1968, p. 65.

*Primary Examiner*—Stanley S. Silverman
*Attorney, Agent, or Firm*—Hill, Van Santen, Steadman, Chiara & Simpson

[57] ABSTRACT

The present invention relates to a binding agent for a magnetic recording medium which consists of a non-magnetic substrate with a magnetic layer formed thereon. The magnetic layer is composed of a finely divided ferromagnetic substance dispersed in the resinous binding agent. The binding agent consists of: a binder containing a butadiene-containing resin, having an average molecular weight of 1,000-10,000, and being selected from the group consisting of butadiene homopolymers and copolymers of butadiene with acrylonitrile and/or styrene which contains at least 60% by weight of butadiene, with the butadiene-containing resin having on the average more than 1.5 functional end groups per molecule, which are reactive with isocyanate groups; and a polyisocyanate compound having on the average not less than 2 isocyanate groups per molecule, the polyisocyanate compound being present in between 5 and 50 parts by weight, based upon 100 parts by weight of the binder. The use of this binding agent allows for greater dispersion of the ferromagnetic powder as the low molecular weight resin has a high solubility in organic solvents. Further, the butadiene-isocyanate crosslinks formed, act to improve wear resistance and make it possible to obtain a desirable elastic modulus.

13 Claims, 2 Drawing Figures

MAGNETIC RECORDING MEDIUM

This is a continuation of application Ser. No. 958,420, filed Nov. 7, 1978 now abandoned.

BACKGROUND OF THE INVENTION

1. Field of the Invention

This invention relates to a magnetic recording medium, and more particularly to a binder of the same.

2. Description of the Prior Art

Generally, in the manufacture of a magnetic tape, ferromagnetic powder, binder and, as the occasion demands, different agents are mixed with each other to prepare a magnetic paint, and then a non-magnetic substrate is coated with the prepared magnetic paint. A high molecular polybutadiene group resin having molecular weight of one hundred thousand, for example, butadiene-acrylonitrile copolymer or butadiene-styrene copolymer, blended with other resins is used for the binder. The high molecular polybutadiene group resin is effective to improve wear resistance of the magnetic tape and flexibility thereof at a lower temperature.

However, such a binder has the following defects:

(1) Since it does not have sufficient solubility for organic solvents, magnetic powder cannot be satisfactorily dispersed throughout it.

(2) Since it has little possibility of crosslinking by chemical bond, the characteristics, particularly elastic modulus, of the magnetic tape deteriorate at high temperature and high humidity. The magnetic tape is apt to adhere to a guide drum, for example, in a video tape recorder, resulting in the deterioration of the tape running characteristics. That becomes a great problem for such apparatus in which the magnetic tape is put under various environmental conditions.

SUMMARY OF THE INVENTION

An object of this invention is to provide a magnetic recording medium which overcomes the above described defects of the conventional magnetic recording medium.

Another object of this invention is to provide a magnetic recording medium which is superior in wear resistance.

A further object of this invention is to provide a magnetic recording medium in which the magnetic powder is uniformly dispersed.

A still further object of this invention is to provide a magnetic recording medium which is improved in running characteristics under high temperature and high humidity.

In accordance with the present invention there is provided a magnetic recording medium which includes a non-magnetic substrate and a magnetic layer formed thereon. The magnetic layer includes a finely divided ferromagnetic substance dispersed in a resinous binding agent. The resinous binding agent consists of (a) a binder containing a butadiene-containing resin having an average molecular weight of 1,000 to 10,000 and being selected from the group consisting of butadiene homopolymers and copolymers of butadiene with acrylonitrile and/or styrene which contain at least 60 percent by weight of butadiene, the butadiene-containing resin having on the average more than 1.5 functional end groups reactive with isocyanate groups per molecule and (b) polyisocyanate compound having on the average not less than two isocyanate groups per molecule, the polyisocyanate compound being present in an amount between 5 and 50 parts by weight based upon 100 parts by weight of the binder.

Various other objects, advantages and features of the present invention will become readily apparent from the ensuing detailed description and the novel features will be particularly pointed out in the appended claims.

DESCRIPTION OF THE PREFERRED EMBODIMENTS

Figure 1:
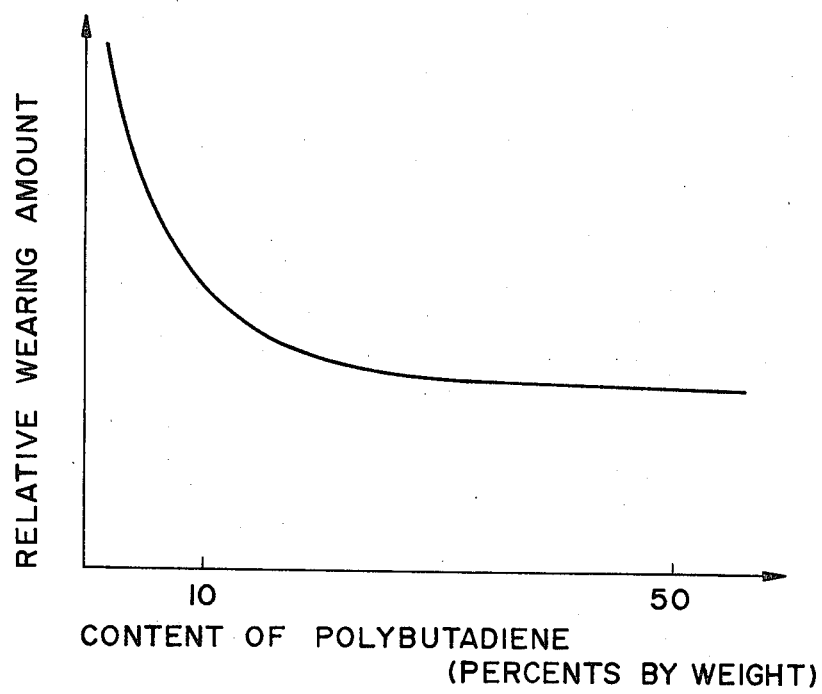
FIG. 1 is a graph showing the relationship between the content (percentages by weight) of reactive polybutadiene having low molecular weight in a binder and the relative wearing amount of the magnetic layer of the magnetic tape.

Polybutadiene or its copolymer used for this invention has a reactive functional group, such as a carboxyl group (—COOH), an amino group (—NH$_2$) or a hydroxyl group (—OH). These functional groups react with the isocyanate group in polyisocyanate compounds, to form chemical bonds (crosslinking).

Examples of polybutadiene or its copolymer containing predominantly polybutadiene, usable for this invention as having low molecular weight and being liquid, are as follows:

Hycar CTB 2000×162 (Tradename: manufactured by Ube Industries, Ltd.).
  End functional group: —COOH
  Number of functional groups: about 1.9 per molecule (average)
  Average molecular weight: about 4000 (100% butadiene).

Hycar CTBN 1300×15 (Tradename: manufactured by the above company).
  End functional group: —COOH
  Number of functional groups: about 1.9 per molecule (average)
  Average molecular weight: about 3400 (90% butadiene-10% acrylonitrile)

Hycar CTBN 1300×8 (Tradename: manufactured by the above company).
  End functional group: —COOH
  Number of functional groups: about 1.9 per molecule (average)
  Average molecule weight: about 3400 (82% butadiene-18% acrylonitrile).

Hycar CTBNX 1300×9 (Tradename: manufactured by the above company).
  End functional group: —COOH
  Number of functional groups: about 2.4 per molecule (average)
  Average molecular weight: about 3400 (82% butadiene-18% acrylonitrile).

Hycar CTBN 1300×13 (Tradename: manufactured by the above company).
  End functional group: —COOH
  Number of functional groups: about 1.9 per molecule (average)
  Average molecular weight: about 3400 (73% butadiene-27% acrylonitrile).

Hycar ATBN 1300×16 (Tradename: manufactured by the above company).

End functional group: —NH$_2$
Number of functional groups: about 1.9 per molecule (average)
Average molecular weight: about 3400 (82% butadiene-18% acrylonitrile).

Nisso-PB-GQ-1000 (Tradename: manufactured by Nippon Soda Co., Ltd.).
End functional group: —OH
Numbers of functional groups: more than about 2.0 per molecule (average)
Average molecular weight: about 1300 (100% butadiene).

Nisso-PB-GQ-2000 (Tradename: manufactured by the above company).
End functional group: —OH
Numbers of functional groups: more than about 2.0 per molecule (average)
Average molecular weight: about 2000 (100% butadiene).

Nisso-PB-GQ-3000 (Tradename: manufactured by the above company).
End functional group: —OH
Numbers of functional groups: more than about 2.0 per molecule (average)
Average molecular weight: about 3000 (100% butadiene).

Nisso-PB-G-1000 (Tradename: manufactured by the above company).
End functional group: —OH
Numbers of functional groups: about 2.0 per molecule (average)
Average molecular weight: about 1300 (100% butadiene).

Nisso-PG-G-2000 (Tradename: manufactured by the above company).
End functional group: —OH
Numbers of functional groups: about 2.0 per molecule (average)
Average molecular weight: about 2000 (100% butadiene).

R-45-HT (Tradename: manufactured by Idemitsu Petrochemical Co.).
End functional group: —OH
Numbers of functional groups: about 2.3 per molecule (average)
Average molecular weight: about 2600 (100% butadiene).

CS-15 (Tradename: manufactured by Idemitsu Petrochemical Co.).
End functional group: —OH
Numbers of functional groups: about 2.7 per molecule (average)
Average molecular weight: about 2600 (75% butadiene-25% styrene).

CN-15 (Tradename: manufactured by Idemitsu Petrochemical Co.).
End functional group: —OH
Numbers of functional groups: about 2.7 per molecule (average)
Average molecular weight: about 2600 (85% butadiene-15% acrylonitrile).

It is required for this invention that the average molecular weight of polybutadiene or its copolymer be as low as from 1,000 to 10,000. Preferably, the average molecular weight of polybutadiene or its copolymer is 1,000 to 5,000. When it is less than 1,000, the magnetic film constituting a part of the magnetic recording medium is brittle, and its flexibility at a low temperature is deteriorated. And when it is more than 10,000, the compatibility of polybutadiene or its copolymer with other resins, and its solubility for organic solvents are deteriorated.

It is required for this invention that the content of polybutadiene or its copolymer be more than 10 percent by weight of the whole binder except for the polyisocyanate compound. More preferably, it is more than 50 percent by weight of the whole binder except for the polyisocyanate compound. As shown in FIG. 1, when the content of reactive polybutadiene having low molecular weight is less than 10 percent by weight of the whole binder except for the polyisocyanate compound, the binder is apt to harden, and the wear resistance of the coated film is deteriorated.

It is required for this invention that the number of the end functional groups in polybutadiene or its copolymer be on the average more than 1.5 per molecule. Preferably, it is on the average between 1.5 and 4.0 per molecule. When it is less than 1.5 per molecule, on the average, there is little crosslinking with polyisocyanate, and so a desirable elastic modulus is hard to obtain.

Polybutadiene or its copolymer, for example, butadiene-acrylonitrile copolymer or butadiene-styrene copolymer is used for this invention. However, it is preferable that the content of copolymerisable monomer such as acrylonitrile or styrene is less than 40 percent by weight in the whole copolymer with butadiene. Further, both polybutadiene and its copolymer may be used together for this invention.

According to this invention, polybutadiene having low molecular weight may be mixed with other resins to form the binder. Examples of the resins having low molecular weight which can be used to constitute the binder together with polybutadiene are vinyl chloride-vinyl acetate copolymer which may contain vinyl alcohol, thermo-plastic polyurethane resin, high molecular weight polybutadiene group resin (butadiene-acrylonitrile copolymer or butadiene-styrene copolymer), and phenol resin.

Examples of polyisocyanate compounds usable for this invention are 2,4-tolylenediisocyanate, 2,6-tolylenediisocyanate, P-phenylenediisocyanate, polymethylenepolyphenylisocyanate, diphenylmethandiisocyanate, m-phenylenediisocyanate, hexamethylene diisocyanate, butylene-1,4-diisocyanate, octamethylenediisocyanate, 3,3'-dimethoxy-4,4'-biphenylenediisocyanate, 1,18-octadecamethylene-diisocyanate, polymethylene-diisocyanate, benzene-triisocyanate, naphthalene-2,4-diisocyanate,3,3'-dimethyl-4,4'-biphenylene diisocyanate 1-methoxyphenylene-2,4-diisocyanate, diphenylene-4,4'-diisocyanate, 4,4'-diisocyanatediphenyl ether, naphtalene-1,5-diisocyanate, diesocyanatedicyclohexyl-methane, P-xylenediisocyanate, m-xylene-diisocyanate, diphenylenediisocyanate hydride, diphenylmethanediisocyanate hydride, toluene-2,4,6-triisocyanate, 3-methyl-4,6,4'-triisocyanate diphenylmethane, 2,4,4'-triisocyanate-diphenyl, 2,4,4'-triisocyanate-diphenylether, long chain hydrocarbon having end group of (—NCO), substituted hydrocarbon having end group of (—NCO), and prepolymer containing reactive polyisocyanate or end group of (—NCO).

It is preferable that the content of polyisocyanate compound be between 5 and 50 parts based on 100 weight parts of the whole binder including polybutadiene or its copolymer. When it is less than 5 parts, there is little crosslinking, so the binder is difficult to harden. And when there is more than 50 parts, the crosslinking is too much, so the coated film is rather brittle.

The preferable range of the ratio of the number of the crosslinking functional groups per molecule of polybutadiene or its copolymer to the number of (—NCO) groups per molecule of polyisocyanate compound is between 1 and 3, that is, $$\frac{\text{number of crosslinking functional groups}}{\text{number of (—NCO) groups}}$$

is preferably in the range of from 1 to 3.

According to this invention, a so-called "chain extender" may be used together with reactive polybutadiene having low molecular weight and polyisocyanate. A polyol (polyhydroxy alcohol) having a low molecular weight of less than 500 may be used as the chain extender. Examples of polyols are diols such as ethylene glycol, diethylene glycol, triethylene glycol, propylene glycol or buthylene glycol; triols such as trimethylolpropane, trimethylolethane, hexane triol or glycerine; a hexaol such as sorbite; and N,N-di-(2-hydroxypropyl) aniline. Less than 10 parts by weight of the chain extender may be present based on 100 parts by weight of the binder.

According to this invention, polybutadiene or its copolymer and polyisocyanate are mixed with each other, and contained in a magnetic paint. For example, a non-magnetic substrate is coated with the magnetic paint in a well-known manner. The coated non-magnetic substrate is then dried, thus obtaining a magnetic tape. Examples of ferromagnetic powder usable for the magnetic paint are $\gamma$-$FE_2O_3$, a mixed crystal of $\gamma$-$Fe_2O_3$ and $Fe_3O_4$, $\gamma$-$Fe_2O_3$ doped with cobalt, $Fe_3O_4$ doped with cobalt, chromium dioxide, barium ferrite, different ferromagnetic alloy powders such as Fe-Co, Co-Ni, Fe-Co-Ni, Fe-Co-B, Fe-Co-Cr-B, Mn-Bi, Mn-Al and Fe-Co-V, iron nitride, etc. A mixture of two or more kinds of the above described ferromagnetic powders may be used for the magnetic paint. Examples of lubricants usable for the magnetic paint or the magnetic layer of the magnetic tape are higher fatty acids having 8 to 18 carbon atoms such as oleic acid, linoleic acid, ricinoleic acid, stearic acid, lauric acid, palmitic acid, caprylic acid, myristic acid, elaidic acid or stearolic acid, esters of the above described fatty acids such as ethyl stearate, polyethylene oxide, reactants of polyethylene oxide, silicone oil, olive oil, lecithin, graphite, carbon, molybdic disulfide, boron nitride, tungsten disulfide, polyfluoroethylene powder, polyethylene powder and a mixture of two or more of them. Examples of reinforcing materials usable for the magnetic layer are aluminum oxide, chromium oxide, silicone oxide and a mixture of two or more of them. Carbon black may be used as an antistatic agent for the magnetic paint. Further, lecithin may be used as a dispersing agent for the magnetic paint.

An organic solvent is used in the preparation of the magnetic paint. Examples of the organic solvents permissible are ketones such as acetone, methylethylketone, methylisobuthylketone and cyclohexanone; alcohols such as methanol, ethanol, propanol and butanol; esters such as methyl acetate, ethyl acetate, buthyl acetate, ethyl lactate, glycol acetate and monoethyl ether; glycol ether such as ethylene glycol dimethyl ether, ethylene glycol monoethyl ether and dioxane; aromatic hydrocarbons such as benzene, toluene and xylene; aliphatic hydrocarbons such as hexane and heptane; nitropropane and a mixture of two or more of them.

Examples of materials for the non-magnetic substrate of the magnetic recording medium according to this invention are polyesters such as polyethylenetelephtalate, polyolefins such as polypropylene, cellulose derivatives such as cellulosetriacetate and cellulosediacetate, polycarbonate, polyvinylchloride, polyimide, metals such as aluminum and copper, and paper.

The following specific examples are submitted to illustrate the invention.

EXAMPLE 1

A magnetic composition having the following ingredients was prepared:

| Ferromagnetic (gamma) ferric oxide | |
| --- | --- |
| ($\gamma$-$Fe_2O_3$)powder | 400 parts by weight |
| Reactive polybutadiene having low molecular weight (Nisso-PB-GQ-3000) | 100 parts by weight |
| Carbon black | 10 parts by weight |
| Lecithin | 5 parts by weight |
| Squalene | 5 parts by weight |
| Solvent | 800 parts by weight |
| (400 parts by weight of methylethylketone and 400 parts by weight of toluene) | |

20 PHR (parts by weight for 100 parts by weight of resin) of polymethylene polyphenylisocyanate as polyisocyanate compound ("PAPI" manufactured by Kasei UpJohn Co.) containing 31.5 percent by weight of (—NCO) was added into the above-identified composition. The resulting mixture was stirred for thirty minutes. The thus obtained magnetic paint was applied to form a resulting thickness of 5$\mu$ onto a non-magnetic substrate, for example, a polyester film by a well-known gravure coater, and then dried. A magnetic tape as labeled Example 1 was obtained. "Coronat L" manufactured by Nippon Polyurethane Co., as polyisocyanate compound could be added into the above-identified composition, instead of "PAPI".

COMPARISON EXAMPLE 1

In the magnetic composition of the EXAMPLE 1, a high molecular butadiene-acrylonitrile copolymer ("Hycar-1432"-Tradename: manufactured by B. F. Goodrich Chemical Company: 76% butadiene-24% acrylonitrile: having average molecular weight of more than 300,000) was used instead of polybutadiene having low molecular weight (Nisso-PB-GQ-3000). A magnetic tape as comparison Example 1 was manufactured in the same manner as the Example 1.

COMPARISON EXAMPLE 2

In the magnetic composition of EXAMPLE 1, a mixture of "Vinylite VAGH" (Tradename: manufactured by Union Carbide Corporation 91% vinyl chloride—3% vinyl acetate—6% vinyl alcohol copolymer) and "Hycar-1432" was used (mixing ratio=50:50) instead of polybutadiene having low molecular weight (Nisso-PB-GQ-3000). A magnetic tape as Comparison Example 2 was manufactured in the same manner as the Example 1.

EXAMPLE 2

In the magnetic composition of the EXAMPLE 1, a mixture of 50 parts of "Vinylite VAGH" and 50 parts of "Nisso-PB-GQ-3000" was used instead of 100 parts of polybutadiene having low molecular weight (Nisso-PB-GQ-3000). A magnetic tape as Example 2 was manufactured in the same manner as Example 1.

EXAMPLE 3

In the magnetic composition of the EXAMPLE 1, a mixture of 30 parts of thermoplastic polyurethane resin ("Estane 5702" manufactured by B. F. Goodrich Chemical Company) and 70 parts of "Nisso-PB-GQ-3000" was used instead of 100 parts of polybutadiene having low molecular weight (Nisso-PB-GQ-3000). A magnetic tape as EXAMPLE 3 was manufactured in the same manner as Example 1.

EXAMPLE 4

In the magnetic composition of the EXAMPLE 1, a mixture of 50 parts of "Hycar CTBN" and 50 parts of "VAGH" was used instead of 100 parts of polybutadiene having low molecular weight (Nisso-PB-GQ-3000). A magnetic tape as Example 4 was manufactured in the same manner as Example 1.

EXAMPLE 5

5 parts of N,N-di-(2-hydroxypropyl) aniline having the following structural formula was further added as the chain extender into the magnetic composition of Example 1 to extend the chain of polyisocyanate:

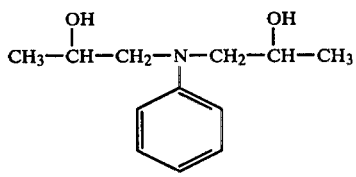

A magnetic tape as Example 5 was manufactured in the same manner as Example 1.

The different characteristics of Examples 1 to 5 of the above described magnetic tape and the Comparison Examples 1 and 2 were measured. The results are shown in Table I.

TABLE I

| | Magnetic characteristics | | | |
|---|---|---|---|---|
| Magnetic Tape | Residual magnetic flux density Br(gauss) | Squareness ratio Rs (%) | Wearing amount (mg) | Runnability (Number) |
| Example 1 | 1300 | 83 | 1.6 | 7100 |
| Example 2 | 1200 | 80 | 1.8 | 7100 |
| Example 3 | 1200 | 80 | 1.8 | 780 |
| Example 4 | 1250 | 80 | 1.9 | 780 |
| Example 5 | 1300 | 81 | 1.4 | 7100 |
| Comparison Example 1 | 900 | 77 | 1.8 | 0 |
| Comparison Example 2 | 1000 | 78 | 1.8 | 10 |

As may be understood from Table I, the wear resistances of Examples 1 to 5 are equal to, or higher than those of the Comparison Examples 1 and 2. Moreover, the residual magnetic flux densities "Br" and squareness ratios "Rs" of Examples 1 to 5 are remarkably improved in comparison with the Comparison Examples 1 and 2. Further, the runnabilities of the Examples 1 to 5 are much higher than those of the Comparison Examples 1 and 2. These facts show that the ferromagnetic powder is more uniformly dispersed in the magnetic layer on the basis of the solubility of the binding agent in the Examples 1 to 5, and that the elastic modulus of the magnetic layer under high temperature and high humidity is improved because of crosslinking of the binding agent in the Examples 1 to 5.

FIG. 1 shows the wearing amounts of the magnetic tapes which were manufactured in the same manner as the Example 1 except that the mixing ratio of reactive polybutadiene having low molecular weight (Nisso-PB-GQ-3000) to vinyl chloride-vinyl acetate copolymer (above-described "VAGH") was changed. It is understood from FIG. 1 that the wearing resistance is improved with the increase of the content of reactive polybutadiene having low molecular weight.

Figure 2:
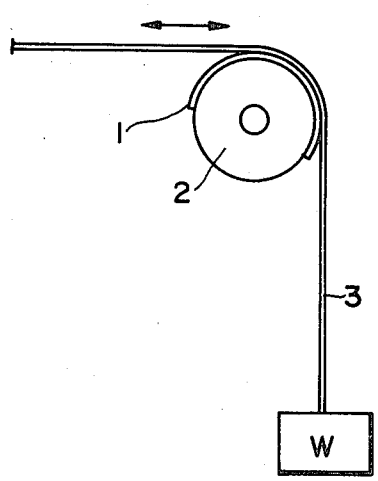
FIG. 2 is a schematic view of a measuring apparatus used for measuring the wearing amount of the magnetic layer of the magnetic tape.

The wearing amounts in FIG. 1 and Table I were measured in the manner shown in FIG. 2. A lapping tape 1 of #800 stipulated according to JIS (Japanese Industrial Standards) R 6001 and JIS R 6253 is wrapped on a roller 2. The magnetic tape 3, cut to the width of ¼ inch (0.635 cm) for the test, to one end of which a load W of 3.53 ounces (100 grams) is fixed, is wrapped on the roller 2 on which the lapping tape 1 is wrapped. In the test, the magnetic tape 3 was slided back and forth by strokes of 3.9 inches (10 cm) one hundred times, and then the decrease of the weight of the magnetic tape 3 was measured. The decrease in weight was labeled as the wearing amount, (the amount of powder rubbed off). The "runnability" was tested at the high temperature of 45° C. and high relative humidity of 80%. The runnability was represented by the number in which the magnetic tape could run without the generation of abnormal noise and stagnation.

In the magnetic recording medium according to this invention, as above described, polybutadiene is contained in the binding agent. Accordingly, the magnetic recording medium is superior in wear resistance and flexibility at a low temperature. Further, since polybutadiene or its copolymer according to this invention has a low molecular weight, its solubility for organic solvents is high, and so the dispersibility of the ferromagnetic powder can be improved. Further, since the functional groups of polybutadiene or its copolymer react with the isocyanate groups of polyisocyanate compound to crosslink, the magnetic recording medium can obtain a desirable elastic modulus. By improving the runnability of the magnetic recording medium, the adherence by the medium-or tape, to the guide drum in, for example, a video tape recorder under high temperatures and humidities can be reduced.

Although several specific examples of the invention have been described, it should be understood that modifications can be made to the specific examples without departing from the invention.

I claim as my invention:

1. In a magnetic recording medium comprising a non-magnetic substrate and a magnetic layer formed thereon, said magnetic layer comprising a finely divided ferromagnetic substance dispersed in a resinous binding agent, said binding agent comprising:
   a binder containing a butadiene-containing resin having an average molecular weight of 1,000 to 10,000 and being selected from the group consisting of butadiene homopolymers and copolymers of butadiene with acrylonitrile and/or styrene which contain at least 60 percent by weight of butadiene, said butadiene-containing resin having on the average more than 1.5 end functional groups reactive with isocyanate groups per molecule; and a polyisocyanate compound having on the average not less than 2 isocyanate groups per molecule, said polyisocyanate compound being present in an amount between 5 and 50 parts by weight based upon 100 parts by weight of said binder.

2. A magnetic recording medium according to claim 1, wherein said end functional group is a carboxyl group, an amino group or an hydroxyl group.

3. A magnetic recording medium according to claim 1, wherein said binder contains more than 10 parts by weight of said butadiene-containing resin per 100 parts by weight of said binder.

4. A magnetic recording medium according to claim 3, wherein said binder contains more than 50 parts by weight of said butadiene-containing resin per 100 parts by weight of said binder.

5. A magnetic recording medium according to claim 1, wherein said average molecular weight is between 1,000 and 5,000.

6. A magnetic recording medium according to claim 1, wherein said butadiene-containing resin has, on the average from 1.5 to 4.0 end functional groups per molecule.

7. A magnetic recording medium according to claim 1, wherein said butadiene-containing resin is butadiene homopolymer.

8. A magnetic recording medium according to claim 1, wherein the ratio of the number of cross-linking functional groups per molecule of said butadiene-containing resin to the number of isocyanate groups per molecule of said polyisocyanate compound is between 1 and 3.

9. A magnetic recording medium according to claim 1, wherein said resinous binding agent further contains a chain extender for said polyisocyanate compound consisting of a polyol.

10. A magnetic recording medium according to claim 1, wherein said binder further contains at least one additional low molecular weight resin selected from the group consisting of vinylchloride-vinyl acetate copolymer, thermoplastic polyurethane resin, phenolic resin, and butadiene-acrylonitrile copolymer, having higher molecular weight than said butadiene-containing resin.

11. A magnetic recording medium according to claim 1, wherein the ratio of the number of cross-linking functional groups per molecule of said butadiene-containing resin to the number of isocyanate groups per molecule of said polyisocyanate compound is between 1 and 3.

12. In a magnetic paint for use in the manufacture of magnetic tape which consists in part of a ferromagnetic powder, an organic solvent, and a binder, the improvement which comprises:

a binder consisting of a butadiene-containing resin selected from the group consisting of butadiene homopolymers and copolymers of butadiene formed from butadiene and at least one member of a group consisting of acrylonitrile and styrene and which contains at least 60% by weight of butadiene, the butadiene-containing resin having on the average more than 1.5 end functional groups reactive with an isocyanate group per molecule and having an average molecular weight of between 1,000 and 10,000, and a polyisocyanate compound having on the average not less than 2 isocyanate groups per molecule and being present in an amount between 5 and 50 parts by weight based upon 100 parts by weight of the binder, said low molecular weight polybutadiene resin reacted with isocyanate groups providing for greater solubility in an organic solvent and therefore more uniform dispersion of the ferromagnetic powder along with greater crosslinking which maintains the elastic modulus of the magnetic tape at high temperatures and high humidities.

13. A magnetic recording medium comprising a non-magnetic substrate and a wear resistant magnetic layer formed thereon, said magnetic layer comprising a finely divided ferromagnetic powder dispersed in a resinous binder, said magnetic layer having been produced by the step sequence of:

(A) forming a liquid magnetic paint composition comprising:

a ferromagnetic powder selected from the group consisting of $\gamma\text{-}Fe_2O_3$, a mixed crystal of $\gamma\text{-}Fe_2O_3$ and $Fe_3O_4$ doped with cobalt, $Fe_3O_4$ doped with cobalt, chromium dioxide, barium ferrite, ferromagnetic alloy powders, and iron nitride, a butadiene-containing resin having an average molecular weight of 1,000 to 10,000 and being selected from the group consisting of butadiene homopolymers and copolymers of butadiene with acrylonitrile and/or styrene which contain at least 60 percent by weight of butadiene, said butadiene-containing resin having on the average more than 1.5 end functional groups reactive with isocyanate groups per molecule, and a solvent for said resin;

(B) admixing with said magnetic paint composition, a polyisocyanate compound having on the average not less than 2 isocyanate groups per molecule in an amount ranging from about 5 to 50 parts by weight based upon each 100 parts by weight of said resin;

(C) coating with the resulting composition of step (B) onto said non-magnetic substrate and (D) drying the so-coated composition.

* * * * *